Oct. 9, 1962 M. WILLIAMS 3,058,099
BISTABLE MAGNETIC DEVICES
Filed May 26, 1959 2 Sheets-Sheet 1

INVENTOR
MICHAEL WILLIAMS
BY
ATTORNEYS

United States Patent Office 3,058,099
Patented Oct. 9, 1962

3,058,099
BISTABLE MAGNETIC DEVICES
Michael Williams, Watford, England, assignor to The General Electric Company Limited, London, England
Filed May 26, 1959, Ser. No. 816,006
Claims priority, application Great Britain May 28, 1958
9 Claims. (Cl. 340—174)

This invention relates to bistable magnetic devices.

The present invention is particularly concerned with bistable magnetic devices including thin films of ferromagnetic material which exhibit uniaxial anisotropy.

Sufficiently thin films of ferromagnetic material have been found to exhibit uniaxial anisotropy so that for any such film there is a so-called "preferred axis" of magnetisation which lies within the film, this preferred axis being an axis parallel to which any magnetisation of the film lies in the absence of an external field. The preferred axis is sometimes referred to as the "easy axis."

For a cyclic variation in magnetising field applied parallel to the preferred axis of such a film, the resulting variation in the magnetisation of the film measured parallel to that preferred axis may be represented by a hysteresis loop which shows that there are two stable states of magnetisation of the film, that is, two states in which there is magnetisation of the film in the absence of an external field. The magnitude of the magnetisation of the film is the same in both of these states, but of opposite sense along the preferred axis.

A film of this kind is referred to herein as a "magnetic thin film."

In view of the existence of the two stable states of magnetisation it has been proposed to use a magnetic thin film as a bistable device to store binary data. Such a bistable device may be switched from one to the other of its two stable states by the application of a magnetic field of suitable magnitude and direction (according to the existing state of that device) along the preferred axis of that film.

The switching of the bistable device from one to the other of its stable states in ideal circumstances is what appears to be a direct rotation of the direction of magnetisation in the plane of the film, and it has been found that such rotation may be performed very rapidly. However, there is a tendency for the direction of magnetisation of the film to be changed not by this direct rotation but by what is believed to be the growth of "reverse" domains in the film. These reverse domains have a direction of magnetisation opposite to that of the major part of the film while no external field is applied thereto. When an external field is applied to the film to reverse its direction of magnetisation the reverse domains grow from the edges of the film to engulf the whole of that film and thereby effect the complete reversal of that direction of magnetisation. Although the growth of these reverse domains has in effect the same result as the rotation of the direction of magnetisation there is the disadvantage that for a given external field the time taken for such a change by growth of reverse domains is much longer than by rotation. Further there is the disadvantage that a change by growth of reverse domains is not so accurately reproducible as one effected by rotation.

The magnitude of the required magnetic field applied along the preferred axis to switch the bistable device from one to the other of its stable states by direct rotation, is normally greater than that which under similar conditions will result in the growth of reverse domains. Thus for the application along the preferred axis of a magnetic field of sufficient magnitude to switch the device by rotation, there is normally the disadvantage that the device is in fact switched by the comparatively low speed growth of reverse domains in the film. In addition there is the added disadvantage that if a magnetic field which has a magnitude insufficient to cause rotation of the direction of magnetisation is applied, either intentionally or unintentionally, along the preferred axis, switching of the bistable device may in fact result by growth of reverse domains.

It is an object of the present invention to provide a bistable magnetic device including a magnetic thin film which may be used to overcome the above disadvantages.

According to the present invention a bistable magnetic device comprises a magnetic thin film, a first electrical conductor arranged to apply a magnetic field to act along the preferred axis within the film for the flow of current along that conductor, and a second electrical conductor arranged to apply a magnetic field to act within the film perpendicular to the preferred axis for the flow of current along that conductor.

The ferromagnetic material of the film may be an alloy of nickel and iron, the proportions of nickel and iron being 82% and 18% respectively. The alloy may include small quantities, for example, from 2 to 4%, of molybdenum and/or copper.

A bistable magnetic device according to the present invention will now be described, by way of example, with reference to the accompanying drawings, in which.

Figure 1:
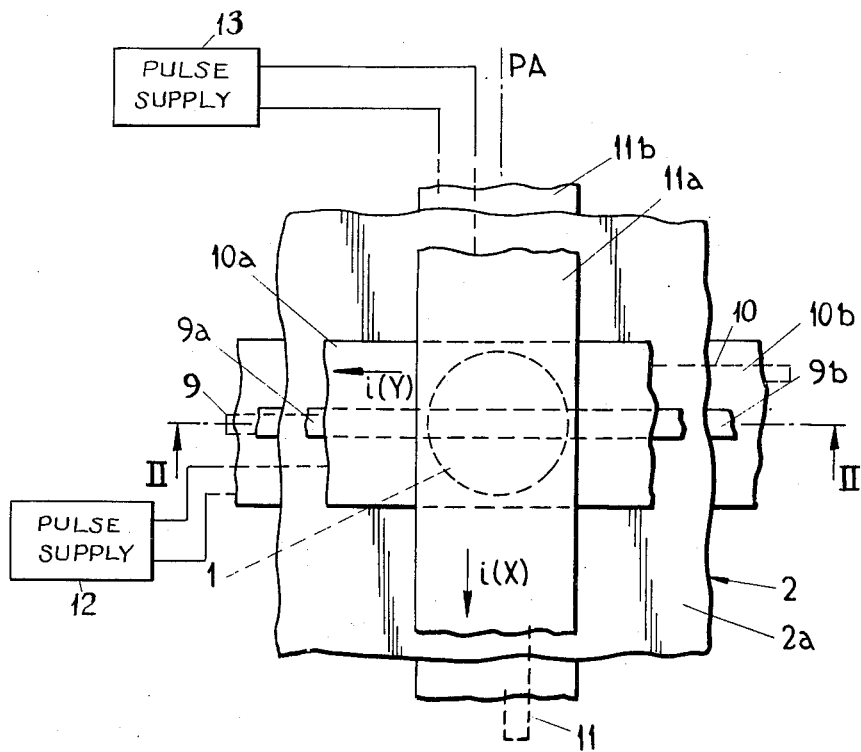
FIGURE 1 is a view of a portion of the bistable magnetic device, this view illustrating the arrangement of the magnetic thin film and its associated electrodes in that device.
Figure 2:
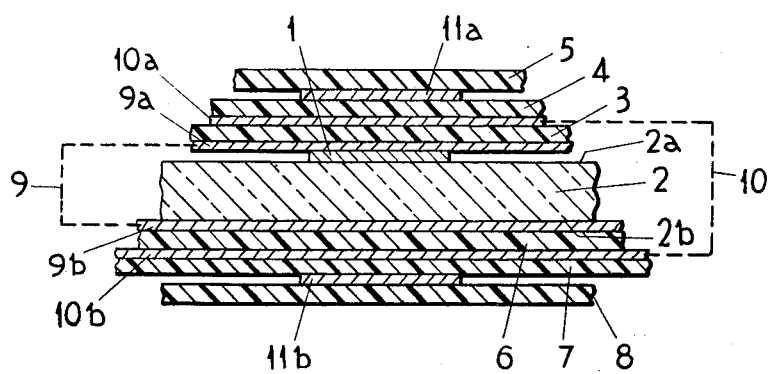
FIGURE 2 is a sectional elevation of the device shown in FIGURE 1, the section of this figure corresponding to that taken on the line II—II of FIGURE 1.

Referring to FIGURES 1 and 2, the bistable magnetic device includes a magnetic thin film 1 which is deposited upon one surface 2a of a glass base-member 2. The film 1 has a diameter of approximately 5 millimetres and a thickness of approximately 1,000 Angstrom units and is deposited upon the surface 2a by evaporation. The preferred axis of magnetisation of the film 1 lies parallel to an axis PA, and there are two stable states of magnetisation parallel to the axis PA in the absence of an external magnetic field in either direction along that axis. These two stable states are referred to as the state "0" and the state "1" respectively.

Three printed circuit boards 3, 4 and 5 lie one upon the other over the film 1 on the surface 2a. In a similar manner, three further printed circuit boards 6, 7, and 8 lie one upon the other over the opposite surface, surface 2b, of the glass base-member 2. The boards 3, 4, 6 and 7 carry copper electrodes 9a, 10a, 9b and 10b respectively, which lie perpendicular to the axis PA. The boards 5 and 8 carry copper electrodes 11a and 11B respectively, these electrodes 11a and 11b lying along the axis PA. The boards 3 to 8 are omitted from FIGURE 1 to show clearly the disposition of the electrodes 9a to 11a and 9b to 11b relative to the film 1.

The electrodes 9a and 10a are electrically connected to the electrodes 9b and 10b at opposite ends of the base-member 2, the interconnected pair of electrodes 9a and 9b and the interconnected pair of electrodes 10a and 10b thereby forming a pick-up conductor 9 and a drive conductor 10 which loop the film 1. The electrodes 11a and 11b are similarly interconnected to thereby form a further drive conductor 11 which also loops the film 1.

The bistable device is switched from one to the other of its stable states in operation by causing a pulse of current, supplied by a pulse supply source 12, to flow in the conductor 10 concurrently with the flow of a current pulse, supplied by a pulse supply source 13, in the conductor 11. If it is desired to set the bistable device to its stable state "0" the current pulse in the conductor 10 is caused to flow in the direction of the arrow $i(Y)$ along the electrode 10a during the flow of the current pulse in the conductor 11. The current which flows in the direction of the arrow $i(Y)$ along the electrode 10a of course flows in the opposite direction along the electrode 10b.

On the other hand if it is desired to set the bistable device to the other of its stable states, that is, to the stable state "1," the current pulse in the conductor 10 flows in the direction of the arrow $i(Y)$ along the electrode 10b and consequently, in the opposite direction along the electrode 10a. In both cases however the magnitude of the current which flows in the conductor 10 is such as to apply a magnetic field of magnitude Hb to the film 1. The direction of this field within the film 1 is parallel to the axis PA in both cases, being in a positive sense (that is, in the direction which is opposite to the arrow $i(X)$) along the axis PA to set the device to the state "0," and in the opposite negative sense to set it to the state "1."

In both cases the current pulse caused to flow in the conductor 11 flows along the electrode 11a in the direction of the arrow $i(X)$ and in the opposite direction along the electrode 11b. The magnitude of the current in the conductor 11 is such as to cause a magnetic field of magnitude Hp to be applied perpendicular to the axis PA within the film 1. The direction of this field is in a positive sense (that is, in the direction which is opposite to the arrow $i(Y)$) perpendicular to the axis PA in the plane of the film 1.

It is arranged that the trailing edge of any current pulse which flows in the conductor 11 occurs during the period of a current pulse in the conductor 10. This ensures that the field Hb applied in either sense along the axis PA is applied until after the field Hp has been removed.

The actual stable state, "0" or "1," of the bistable device may be determined at any time by causing a current pulse to flow in the conductor 11. The effect of this pulse is to cause a flux change parallel to the axis PA in the film 1 whether or not the film is in the state "1" or "0," but the flux changes are of opposite sense in the two cases. As a result, different voltage waveforms are induced in the pick-up conductor 9 in the two cases. The actual state of the device may be indicated therefore, simply by discriminating between the two different voltage waveforms.

The above method of determining the state of the bistable device is destructive since the state of the film 1 may not be the same after that method has been performed as it was before.

The operation of the bistable device as described above will now be explained wtih reference to the hysteresis loops shown in FIGURES 3(a) to (c).

Figure 3A:
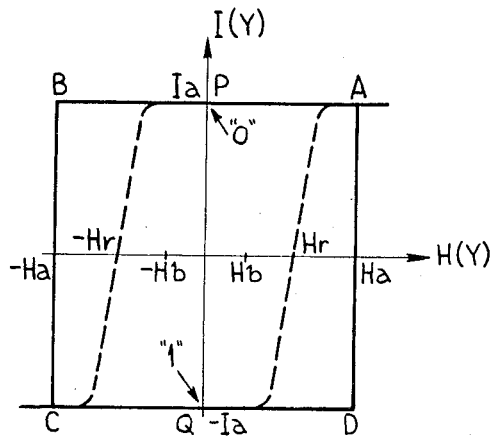
FIGURES 3(a) to (c) are hysteresis loops of the magnetic thin film shown in FIGURES 1 and 2.

Referring to FIGURE 3(a), the hysteresis loop ABCD of the film 1 taken along the preferred axis PA, is theoretically rectangular and symmetrical about both axes thereof. This hysteresis loop represents the variation in intensity of magnetisation $I(Y)$ of the film 1 parallel to the axis PA, for a cyclic variation in magnetising field $H(Y)$ applied parallel to the axis PA only.

The hysteresis loop ABCD is that which would be obtained for what appears to be a reversal of the direction of the magnetisation along the axis PA by rotation within the plane of the film 1. The intensity of magnetisation of the film 1 in each of the stable states "0" and "1" is of equal magnitude Ia, but of opposite sense along the axis PA. These stable states are represented on the loop ABCD by the points P and Q respectively.

Assuming that the magnetisation of the film 1 is initially in the stable state "0," then according to the loop ABCD this magnetisation will not change from Ia either on, or as a result of, the application along the axis PA of a magnetic field of any magnitude in the positive sense, or, theoretically, of a magnitude up to just less than Ha in the negative sense. If however, a magnetic field of magnitude equal to, or greater than Ha is applied along the axis PA in the negative sense, a change in magnetisation of the film 1 will result by rotation, the intensity of magnetisation of the film 1 along the axis PA becoming —Ia. The intensity of magnetisation of the film 1 remains at —Ia, so that the film 1 adopts the stable state "1," on the removal of this latter field.

While in the stable state "1", the magnetisation of the film 1 will not change from —Ia either on, or as a result of the application along the axis PA of a magnetic field of any magnitude in the negative sense, or, theoretically, of a magnitude up to just less than Ha in the positive sense. If, however, a magnetic field of magnitude equal to, or greater than Ha is applied along the axis PA in the positive sense a change in magnetisation of the film 1 results by rotation, the intensity of magnetisation of the film 1 along the axis PA becoming once again, Ia. The magnetisation of the film 1, when this latter field is removed, will remain at Ia, the film 1 adopting once again the stable state "0".

As indicated above, however, there is a tendency for the direction of magnetisation of a magnetic thin film to be changed not by direct rotation but by what is believed to be the growth of reverse domains in the film. The growth of reverse domains may occur for example (as indicated by dotted lines in FIGURE 3(a)) upon the application of a field of magnitude equal to or greater than Hr in the negative sense when the magnetisation of the film 1 is in the stable state "0", or, in the positive sense when this magnetisation is in the stable state "1." Thus since Hr is less than Ha, the stable state of the film 1 may be changed by the growth of reverse domains for the application of a field of magnitude Ha, rather than by the much faster rotation of the direction of magnetisation.

The magnitude Hb of the magnetic field which is applied to the film 1 due to the flow of current in the conductor 10 is substantially less than either Ha or Hr. Thus while the hysteresis loop shown in FIGURE 3(a) applies to the film 1 the application of the field Hb does not change the stable state of magnetisation of that film by either rotation or the growth of reverse domains.

Figure 3C:
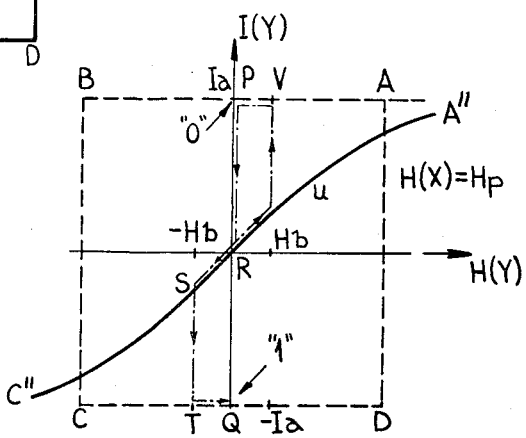
Figure 3B:
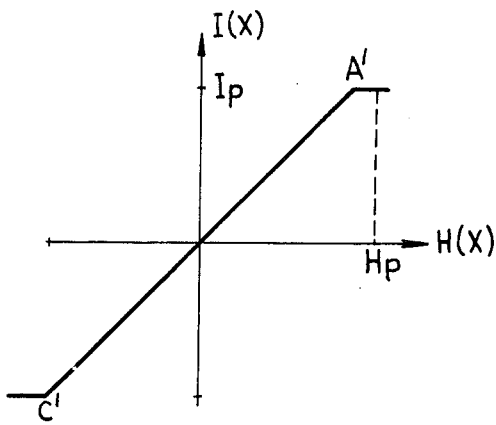

Referring now to FIGURE 3(b), the hysteresis loop A'C' of the film 1 taken at right angles to the preferred axis PA within the film 1 is ideally linear. This hysteresis loop represents the variation in intensity of magnetisation $I(X)$ of the film 1 perpendicular to the axis PA in the plane of that film, for a cyclic variation in magnetising field $H(X)$ applied perpendicular to the axis PA also in the plane of the film 1.

From the ideal hysteresis loop A'C' there is no stable state of magnetisation of the film 1 perpendicular to the axis PA since, in the absence of an external magnetising field in this direction the intensity of magnetisation perpendicular to the axis PA is always zero. Although the intensity of magnetisation of the film 1 becomes Ip with the flow of a current pulse in the conductor 11 (that is, in the presence of a field Hp), magnetisation of that film 1 is always zero in the absence of an external field perpendicular to the axis PA.

It has been found that the actual loop obtained in practice is linear for fields of relatively small magnitude applied perpendicular to the axis PA. This is not so, however, for fields of large magnitude such as Hp which cause saturation of the film 1 perpendicular to the axis PA in the absence of a field parallel to the axis PA. On the other hand the form of the loop in this latter case does not materially affect the operation of the bistable device.

The hysteresis loop ABCD of FIGURE 3(a) is that which is obtained for reversal of the direction of magnetisation of the film 1 along the preferred axis PA by rotation. However, this loop is modified if a magnetising field H$p$ is applied perpendicular to the axis PA in the plane of the film 1, the modified form of this loop being illustrated in FIGURE 3(c).

Referring to FIGURE 3(c), the modified loop A″C″ shows that there is a substantial change in the intensity of magnetisation of the film 1 along the axis PA for the application of the field H$p$ perpendicular to that axis. Such a field is applied to the film 1 by the flow of a current pulse in the conductor 11.

If, for example, the film 1 is in the stable state "0," and therefore has a state represented by the point P, there is a reduction from I$a$ to zero in the intensity of magnetisation along the axis PA during the flow of a current pulse in the conductor 11. The new state of the film 1 is then represented by the point R on the loop A″C″. While the loop A″C″ applies the flow of a current pulse in the conductor 10 causes the intensity of magnetisation along the axis PA to change from zero. For example if the current pulse flows along the electrode 10$a$ in the direction opposite to the arrow $i$(Y) the new state of the film 1 is represented by the point S on the loop A″C″.

The current pulse in the conductor 10 is maintained after the cessation of the current pulse in the conductor 11 so that the intensity of magnetisation along the axis becomes −I$a$. The state of the film 1 is now as represented by the point T on the loop ABCD. The loop ABCD of course applies again as soon as the current pulse in the conductor 11 ceases.

At the end of the current pulse in the conductor 10 the state of the film 1 becomes that represented by the point Q, that is, the point representative of the stable state "1."

If, however, the current pulse flows along the electrode 10$a$ in the direction of the arrow $i$(Y) rather than in the opposite direction, the new state of the film 1 while the pulses flow concurrently in the conductors 10 and 11 is represented by the point U on the loop A″C″. After the cessation of the pulse in the conductor 11 the new state is represented by the point V, and after the cessation of the pulse in the conductor 10 the state becomes once again that represented by the point P.

If the film 1 is originally in the stable state "1" (that is, in the state represented by the point Q) there will be a change in stable state of that film from "1" to "0" only if a current pulse flows along the electrode 10$a$ in the direction of the arrow $i$(Y) during the flow of a current pulse in the conductor 11. The state of magnetisation progressively changes to the state represented by the point P through the states represented by the points R, U and V. On the other hand if the current pulse flows along the electrode 10$a$ in the direction opposite to the arrow $i$(Y) there is no change in stable state, the state of magnetisation of the film 1 in these circumstances progressively changing back to the state represented by the point Q through the states represented by the points R, S and T.

Since the field (H$b$) applied along the preferred axis of the film 1 is always less than that (H$r$) for which there would be growth of reverse domains, the changes in state of the film 1 are always effected by rotation of its direction of magnetisation.

The loop A″C″ shown in FIGURE 3(c) applies to the film 1 only while a current pulse flows in the conductor 11, the loop shown in FIGURE 3(a) applying at all other times. Consequently there is no change in stable state of the film 1 due to the flow of current pulses in the conductor 10 if no current pulse flows in the conductor 11. In the absence of the magnetic field H$p$ which is due to the flow of current in the conductor 11, the magnitude H$b$ of the field applied along the axis PA for current pulses in the conductor 10 is insufficient to effect a change in stable state by rotation or growth of reverse domains.

Although in the above example described with reference to FIGURES 1 and 2, two conductors, the conductors 9 and 10, are required, a single conductor might be used as a combined drive and pick-up conductor.

The magnitude of the current pulse caused to flow in the conductor 11 may be as large as desired, the larger this magnitude then in general the smaller the required magnitude of the current which flows in the conductor 10. Since the current in the conductor 10 may be arranged to be very small the film 1 may have a hysteresis loop along the axis PA which departs substantially from the ideal rectangular form. This means that a relatively large demagnetising field is permissible within the film 1 so that the dimensions of this film are not critical. For example, a film having a diameter of 5 millimetres and a coercivity of 3 oersteds may have a thickness as large as 2,000 Angstrom units.

In one bistable device constructed as described above with reference to FIGURES 1, 2 and 3, the film 1 has a coercivity of 5 oersteds. The current required in the conductor 11 to produce the field H$p$ perpendicular to the preferred axis of the film is 1 amp. In addition the field H$b$ applied along the preferred axis of the film is 0.5 oersted, the current required in the conductor 10 to produce this field being 100 milliamps.

Although the field H$p$ in the present case is of sufficient magnitude to saturate the film 1 in the direction perpendicular to the axis PA, it is not essential that this should be so. It is only necessary that the field applied in this direction by the flow of a current pulse in the conductor 11 shall be of sufficient magnitude to effect a change in stable state in the presence of the field H$b$ applied parallel to the axis PA. On the other hand the permissible tolerances in the characteristics of the film 1, and the magnitude of the field H$b$ itself, are in general wider the larger the field applied perpendicular to the axis PA.

In general the advantage of the wide tolerances is obtained when the field applied in the direction perpendicular to the preferred axis within the film 1 has a magnitude which is greater than 0.6 of the magnitude which would just saturate that film in that direction.

The state of the film 1 may be determined by a non-destructive method instead of the destructive method described above. In this alternative method it is arranged that the pulse of current which flows in the conductor 11 of the selected column is, for example, of only half the normal magnitude. As as result there is no change in the stable state of the film 1, however the application of this field perpendicular to the axis PA does result in a change in flux along the axis PA within the film 1. This change in flux corresponds to that which takes place in the film 1 when the field H$p$ is applied perpendicular to the axis PA.

The sense of the flux change along the axis PA in the film is dependent upon the state "0" or "1" occupied by that film. Pulses are induced in the pick-up conductor 9 as a result of this flux change in the film 1, two pulses being induced in the conductor 9 as a result of the leading and trailing edges respectively, of the current pulse in the conductor 11. The two pulses induced in the conductor 9 are of opposite polarity but the sequence in which those pulses of different polarities appear in that conductor 9 is dependent upon the existing state of the film 1. In this case therefore, it is only necessary to detect the polarity of the first (or, alternatively, the second) of the pair of pulses to appear in the conductor 9 in order to determine the existing state of the film 1.

It is believed that the range of possible thicknesses of a "thin film" is from 100 to 30,000 Angstrom units, but it is preferable that this thickness shall be within the range of 300 to 3,000 Angstrom units.

A method of manufacturing the bistable device described above is described in the present applicant's United States patent application Serial No. 816,007, filed May 26, 1959.

I claim:
1. A bistable magnetic device comprising a uniaxially anisotropic magnetic thin film having a preferred axis of magnetization, a first electrical conductor for applying a magnetic field to the film along the preferred axis, a second electrical conductor for applying a magnetic field to the film perpendicular to the preferred axis, means mounting the first and second conductors inclined to one another across the film, first current supply means selectively to supply first current pulses to said first conductor, and second current supply means selectively to supply to said second conductor second current pulses each of which flows concurrently with a said first pulse and has a trailing edge that occurs before the trailing edge of the said first pulse, each first pulse having a magnitude that is sufficient to effect a change in stable state of magnetization of the film only in the presence of magnetic polarization of the film perpendicular to the preferred axis that results from a said second pulse.

2. A bistable magnetic device according to claim 1 wherein said first conductor has two portions on opposite sides of the film.

3. A bistable magnetic device according to claim 2 wherein said two portions wholly overlap the film on the two opposite sides respectively.

4. A bistable magnetic device according to claim 1 wherein said second conductor has two portions on opposite sides of the film.

5. A bistable magnetic device according to claim 4 wherein said two portions of the second conductor wholly overlap the film on the two opposite sides respectively.

6. A bistable magnetic device according to claim 1 wherein the magnitude of said magnetic polarization is substantially greater than 0.6 of the magnitude required to saturate the film in that direction.

7. A bistable magnetic device according to claim 1 wherein the film is of a nickel-iron alloy.

8. A bistable magnetic device according to claim 7 wherein said alloy is composed, at least substantially, of 82% nickel and 18% iron.

9. A bistable magnetic device according to claim 1 wherein the thickness of the film is within the range of 300 to 3,000 Angstrom units.

References Cited in the file of this patent

UNITED STATES PATENTS 2,811,652    Lipkin _____ Oct. 29, 1957

OTHER REFERENCES

"Magnetic Domains in Evaporated Thin Films of Nickel-Iron," Physical Review, volume 104, No. 3, pages 645–649, Nov. 1, 1956.

"A Compact Coincident-Current Memory," by A. V. Pohm and S. M. Rubens. Proceedings of the Eastern Joint Computer Conference, Dec. 10–12, 1956, pages 120–123.